Patented July 12, 1949

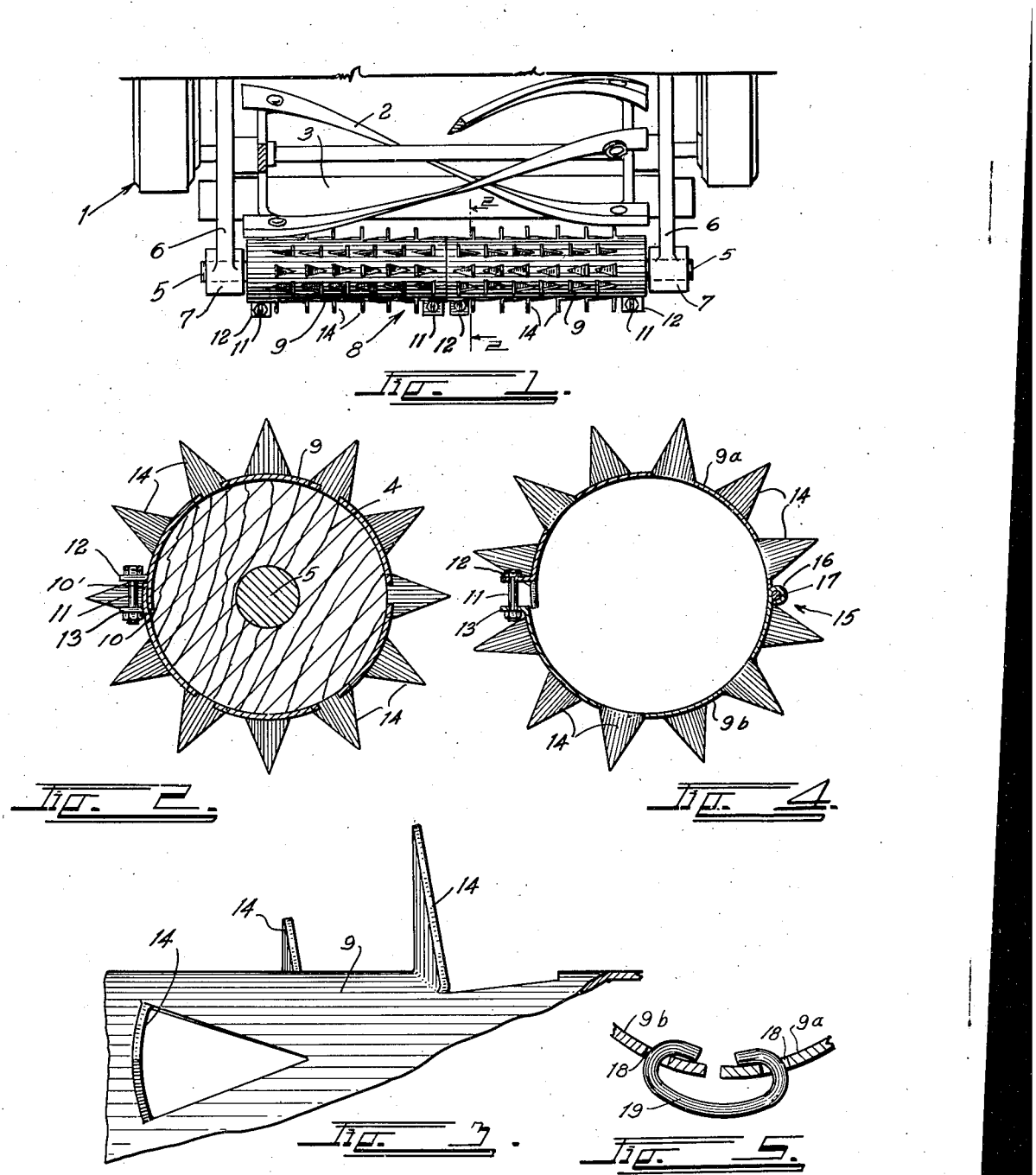

2,476,084

UNITED STATES PATENT OFFICE 2,476,084

MOWER ATTACHMENT

Claude J. Cour, University City, Mo.

Application April 30, 1945, Serial No. 591,168

6 Claims. (Cl. 56—249)

This invention relates to a mower and more particularly to an attachment for a lawn mower although it can be associated with mowers for other purposes.

One of the objects of the invention is to provide a mower with means for loosening and cultivating the ground immediately after the cutting of grass growing therefrom.

Another object is to provide a ground loosening means for use with a mower which can be quickly and efficiently attached to and detached from a mower roller positioned at the rear of the cutting mechanism.

Still another and more specific object is to provide a pronged cylindrical member for attachment in surrounding relation to a lawn mower roller.

A further object is to provide ground cultivating means for a lawn mower which can be employed when desired without any changing of the structure of lawn mowers as presently constructed.

A still further object is to provide a ground cultivator or scarifier for a lawn mower that is simple in construction, easily and economically manufactured and efficient in use.

Other objects of the invention will become apparent from the following description taken in connection with the accompanying drawings in which:

Figure 1 is a view of a portion of a lawn mower provided with a ground cultivator or scarifier embodying my invention;

Figure 2 is a cross section view through the cylindrical attachment and roller showing details of construction, said view being taken on the line 2—2 of Figure 1;

Figure 3 is an enlarged view showing the shape of the prongs;

Figure 4 is a cross section view showing a modified hinged construction; and

Figure 5 is a section view showing another type of hinge.

Referring to the drawings in detail and first to Figures 1, 2 and 3, the numeral 1 generally indicates a lawn mower which has a cutting reel 2 cooperating with a cutter bar 3 in a well known manner to cut grass as the mower is moved either by hand or by power across the lawn. Attached to the lawn mower, immediately at the rear of the cutter bar, is the usual roller 4 which is generally made of wood and is provided with metal shaft extensions 5 whereby the roller is journaled in supporting brackets 6 by means of holes 7 therein.

In accordance with my invention I mount on the roller 4 an earth loosening or cultivating device generally indicated by the numeral 8. This cultivator may be one member which surrounds the roller and extends the entire length of the roller or it may be made in sectional lengths such as the two sections shown in Figure 1. Each length comprises a single sheet of material, such as steel, which is curved to provide a cylindrical tubular member 9 approximately the same inner diameter as the outer diameter of the roller of the lawn mower. These tubular members, as so formed, will be longitudinally split having longitudinally extending adjacent edges 10 and 10'.

In order to secure the cultivator to the roller, means are provided for contracting the cylindrical or tubular member, such means comprising bolts 11 which extend through and between struck out portions 12 and 13 adjacent the edges 10 and 10'. By tightening or loosening the bolts the circumference of the member can be changed.

The member 9 is provided with a plurality of prongs 14 which are constructed by having the material of the sheet forming the cylindrical member V-cut and the cut portions bent outwardly. As best shown in Figure 3 the V-shaped portions which are cut out of the sheet to form the prongs are deformed slightly to make them concave on one side and convex on the other to thus lend strength to the prongs. The prongs may be of any number and also may be arranged as desired, either in rows or staggered. These prongs 14, together with the portions 12 and 13, which all extend outwardly, are struck out of the sheet from which the cylindrical member is formed prior to the curving of the sheet to cylindrical shape.

In placing the cylindrical member on the roller, the roller is first removed from the mower and then the cylindrical members are slid onto the roller after the bolts are so adjusted that the internal diameter of the cylinder is greater than the diameter of the roller. The bolts are then tightened, thus contracting the cylindrical member into tight engagement with the roller so that the roller and cylindrical member will be a single unit. The roller, after mounting thereon the two pronged members, is then replaced on the lawn mower and the cultivator is ready for use.

With the mower provided with a cultivator embodying my invention the earth immediately at the rear of the lawn mower will be loosened by the prongs as the grass of the lawn is cut. When the lawn mower is moved during cutting the roller will be rotated and the prongs will gouge into the ground and loosen the earth. By loosening or Scarifying the earth the lawn will be considerably benefited as moisture will be conserved thus reducing the necessity for sprinkling and its water cost. Loosening of the earth will also reduce weed and water grass growth and let air into the lawn grass roots and enhance growth of the grass. The cultivator is also helpful in loosening the earth of the lawn before sowing seed, fertilizing or liming. It also establishes a better seed bed for seed coming from the growing grass thus resulting in thicker grass growth.

The roller is also helpful in mowing the lawn, especially when the mower is moved generally horizontally on steep terraces since it then prevents side slipping of the mower. The cultivator can be used as often as desired and found necessary. It can be readily removed at any time by merely removing the roller and slipping off the pronged cylindrical member or members after loosening the bolts.

The cylindrical member is so made that it can be used on mowers of varying diameters. If the cylindrical member is used on a roller which has a circumference less than the circumference of the body material of the cylinder (as when roller is worn), then the adjacent longitudinal edges can be overlapped as indicated and the bolts tightened up to so contract the circumference of the cylinder that it will grip the roller. If the roller is somewhat larger, then of course the overlapping will not be necessary.

In Figure 4 I have shown a slightly modified construction for cultivator. In place of making the cylindrical member from one sheet of material it is made from two sheets, each of which is curved to form one-half of a cylinder. These two halves indicated at 9a and 9b are hinged together along one pair of companion edges by means of a hinge construction 15 which comprises tubular eyes 16 carried at the edges of the two halves and a hinge pin 17. The rest of the construction is the same as that previously described. The connecting and contracting bolts are associated with the other two longitudinally extending edges of the two half cylinder pieces. By employing this hinged construction it will be possible to attach and detach the cultivator without removing the roller from its end supporting brackets. To attach the hinged type of cultivator all that need be done is remove the bolts, open up the two cylinder halves, slip it sideways over the roller and then replace and tighten the bolts.

In Figure 5 there is shown a different hinge arrangement. The two halves 9a and 9b are provided with holes 18 adjacent the edges to be hinged and a link 19 constructed as shown connects the half cylinders by extending through the holes.

Although I have shown my attachment as being used on the roller of a reel type of lawn mower, it is to be understood that it can be used on any type of mower for cultivating the ground immediately at the rear of the cutting bar as the grass is being mowed. Therefore, being aware of its many uses and also of the possibilities of modifications in the particular structure shown and described, I do not intend that the scope of the invention be limited in any way other than in accordance with the appended claims.

What is claimed is:

1. A cultivator attachment for association with a mower roller comprising two curved members having prongs projecting outwardly therefrom, means for hinging the members together so as to permit the members to open to receive the roller, and means for securing the curved members to the roller in surrounding relation.

2. A cultivator attachment for association with a mower roller comprising two semi-cylindrical members having prongs projecting outwardly therefrom, means for hinging the members together so as to form a cylindrical member capable of opening to receive the roller, means providing projections on the semi-cylindrical members adjacent the edges opposite the hinge, and bolts cooperating with the projections for clamping the semi-cylindrical members to the roller.

3. A cultivator attachment for association with a mower roller comprising two semi-cylindrical members having prongs projecting outwardly therefrom, means comprising a link for hinging the members together so as to form a cylinder capable of opening to receive the roller, and detachable means for clamping the members to the roller in surrounding relation.

4. A cultivator attachment for mounting on the existing cylindrical roller of a mower positioned at the rear of the cutting mechanism, said attachment comprising a band means of considerable length for surrounding and gripping the cylindrical surface of the roller and being provided with outwardly projecting prongs struck from the material forming the band means, and disconnectable means for establishing the gripping action of the band means.

5. A cultivator attachment for mounting on the existing cylindrical roller of a mower positioned at the rear of the cutting mechanism, said attachment comprising a cylindrical means provided with outwardly extending prongs, said cylindrical means being of considerable length with a longitudinal split and having a curvature on its inner surface corresponding to the roller so that it can closely fit thereon, and readily detachable means associated with the part of the cylindrical means at the split for contracting said means onto the roller in gripping relation.

6. A cultivator attachment for mounting on the existing cylindrical roller of a mower positioned at the rear of the cutting mechanism, said attachment comprising a sheet of metal curved to have a radius of curvature substantially the same as the radius of curvature of the external surface of the roller, said sheet being of substantial length and having outwardly extending prongs struck out from the material of the sheet and arranged in spaced relation both axially and circumferentially, and means for readily attaching the curved sheet in gripping relation to the roller surface and permitting its removal without removing the roller from the mower.

CLAUDE J. COUR.

REFERENCES CITED

The following references are of record in the file of this patent:

UNITED STATES PATENTS

| Number | Name | Date |
|---|---|---|
| 724,855 | Haertlein | Apr. 7, 1903 |
| 747,933 | Burnett | Dec. 29, 1903 |
| 943,989 | Nacke | Dec. 21, 1909 |
| 1,385,007 | Kerr | July 19, 1921 |
| 1,387,725 | Johnson | Aug. 16, 1921 |
| 1,575,985 | Galvin et al. | Mar. 9, 1926 |
| 2,231,821 | Sprouse | Feb. 11, 1941 |

FOREIGN PATENTS

| Number | Country | Date |
|---|---|---|
| 9,032 | Great Britain | 1911 |